March 2, 1948.  A. J. MUMMERT ET AL  2,436,896
PISTON PACKING
Filed Dec. 16, 1939
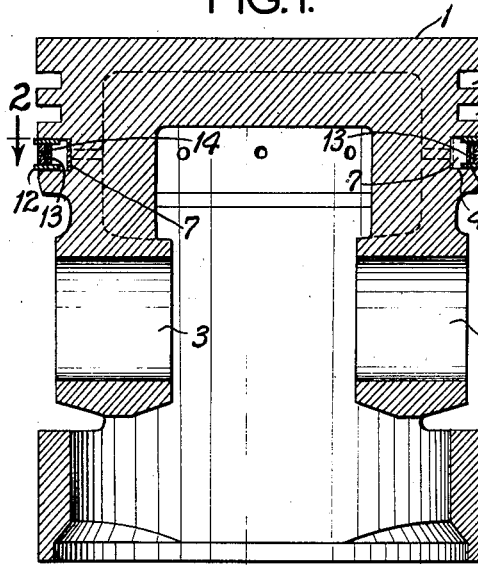
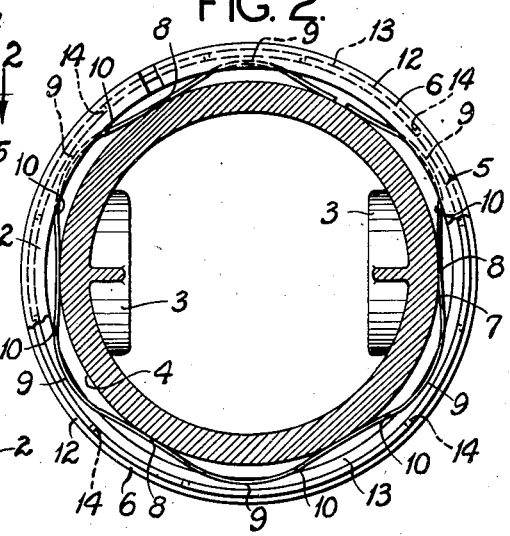
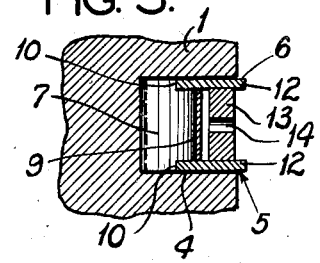
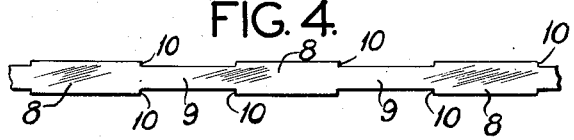
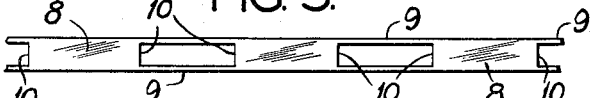
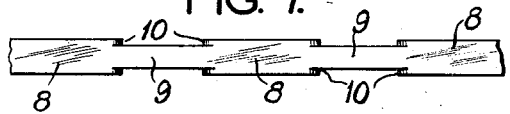
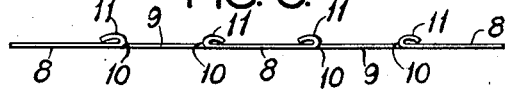
INVENTORS
HAROLD P. PHILLIPS
AND ARDEN J. MUMMERT
BY J. Henry Kinealy
ATTORNEY Patented Mar. 2, 1948

2,436,896

UNITED STATES PATENT OFFICE 2,436,896

PISTON PACKING

Arden J. Mummert, University City, and Harold P. Phillips, Webster Groves, Mo., assignors, by mesne assignments, to Perfect Circle Corporation, a corporation of Indiana Application December 16, 1939, Serial No. 309,680

6 Claims. (Cl. 309—45)

Our invention relates to piston packings and more particularly to a piston packing adapted for use in internal combustion engines and arranged to exert throughout its length a substantially uniform force on the cylinder wall whereby an effective seal is provided between the piston and the cylinder in which the piston reciprocates.

It has been known for some time that if sinuously formed expanders are confined in a small space between a piston ring and the bottom of a ring groove a small variation in the distance between the bottom of the ring groove and the piston ring results in a much larger variation in the force exerted by the expander on the piston ring. Therefore, if the ring is not spaced equally from the bottom of the ring groove throughout its entire length slight variations in this distance will result in the piston ring exerting unequal pressures on the cylinder wall thus increasing wear on the ring at these places. It is known also that the larger is the space in which the resilient portions of the expander may function, and referred to later as effective space, the smaller will be the relative variation of the force exerted by the expander on the piston ring for any given variation in distance between the ring groove and piston ring. For other reasons, however, it is necessary that the distance between the bottom of the ring groove and the piston ring be as small as possible so that the resulting difficulties mentioned above must be overcome in some way other than by increasing the space between the ring and the ring groove.

Piston expanders as used heretofore were positioned in the space between the piston ring and bottom of the ring groove with the attendant disadvantages mentioned above. Also, the portion of the expander contacting the ring was small in area as compared to the entire area of the expander, and the force exerted on the ring by the expander acted through this small area. The ring rotated relative to the expander with the result that the portions of the expander contacting the ring were subjected to excessive wear. Because of these conditions often the expander would break in use.

In view of the difficulties encountered heretofore, my invention contemplates, in its broadest aspect, a piston packing including a ring expander which is formed sinuously and has alternate resilient portions and connecting portions. The connecting portions each are arranged to provide a ring contacting shoulder which is adapted to engage and exert an expansive force on a packing structure at a surface less in width than the packing structure so that the remainder of each of the connecting portions is maintained out of such engagement with the packing structure.

As stated above, the shoulders on the expander engage the packing structure so that the expander will not wear through and break as heretofore. In the present embodiment, the connecting portions joining adjacent resilient portions may be positioned in a groove or channel formed in the piston ring. For this reason, the effective space between the ring and ring groove is increased because the resilient portions of the expander have the entire space between the piston and the rear surface of the ring in which to operate, whereas the older structures had the connecting portions and the resilient portions both positioned therein.

In its narrower concept, our invention contemplates a piston packing including a plurality of ring members and a resilient expander of the kind described briefly above. The connecting portions provide shoulders adapted to engage the ring members and the remainder of the connecting portions may extend therebetween. In some instances it may be desirable to utilize as a spacer for the ring members that part of each connecting portion extending therebetween, or, in other instances, it may be desirable to use an independent spacer to separate the ring members.

From this broad description of our new device it will be clear that one object of our invention is to provide a piston packing including a ring expander comprised of long resilient portions and short connecting portions, the short connecting portions being arranged to extend into a formation provided therefor in the ring.

Another object of our invention is to provide a piston packing including a resilient expander of sinuous form having shoulders thereon adapted to engage the piston ring so that wear on the connecting portions is eliminated.

Another object of our invention is to provide a piston packing including a resilient expander which may be used with a plurality of ring members to exert a radial force thereon and to space said ring members a predetermined distance from each other.

Other objects and advantages will be apparent to those skilled in the art from the following description wherein reference is made to the drawings illustrating a preferred embodiment of our invention and wherein similar reference numerals designate similar parts throughout the several views.

Referring to the drawings,

Fig. 1 is a vertical section of a piston provided with a piston packing constructed according to our invention.

Fig. 2 is a section taken on the line 2—2 of Fig. 1.

Fig. 3 is a detail showing a vertical section of our new piston packing.

Figs. 4, 5, 6 and 7 are plan views in developed form of piston ring expanders formed according to our invention, and Fig. 8 is a side elevation of the developed expander shown in Fig. 7.

Referring to the figures, the piston shown therein is of any usual construction and has a head 1, a skirt 2, and bosses 3. The head has the usual ring grooves 4 wherein is provided a piston packing 5 constructed according to our invention and including a piston ring 6 and a ring expander 7 which is sinuously formed and is comprised of alternate resilient portions 8 and connecting portions 9. The resilient portions 8 are adapted to exert a tension on the bottom of the ring groove 4 and on the piston ring 6 and the connecting portions 9 are arranged to connect adjacent resilient portions 8 and to provide a ring contacting shoulder 10 which is adapted to engage the piston ring 6.

In the present embodiment, the expander is of general polygonal shape so that the connecting portions are of lesser length and smaller diameter than the resilient portions.

In the developed embodiments shown in Figs. 4 and 5 the shoulders 10 are formed by cutting away a part of the expander at the connecting portions 9. In the developed embodiment shown in Fig. 6 shoulders 10 are formed by compressing the connecting portions 9 so that they are narrower than the resilient portions 8. In the developed embodiment shown in Figs. 7 and 8 shoulders are provided by forming transverse and longitudinal incisions in the expander and folding back the cut portions to form on each shoulder 10 a lip 11 which is adapted to contact the piston ring 6. In all the embodiments just described the connecting portions 9 when assembled on a piston preferably extend between formations provided on the rear face of the ring which may be constructed of one part, or a plurality of parts may be used as in the embodiment shown in the drawings and described below.

The piston ring 6 shown in the drawings is comprised of a plurality of split ring members 12 preferably constructed of spring steel and each having a thickness much less than its width. The ring members 12 are placed adjacent the upper and lower sides of the ring groove 4 and are arranged to contact the shoulders 10 on the expander 7, and in some instances, the connecting portions 9 may be used to separate the ring members 12 a predetermined distance from each other. In other instances the connecting portions 9 of the expander may extend between the ring members 12, but a separate spacer 13 may be utilized to space the ring members 12 from each other. The spacer 13 preferably has a smaller diameter than the ring members 12 and does not contact either the cylinder wall or the expander 7.

The piston packing shown in the drawings and described herein may be used either as a compression ring or as an oil ring. If the packing structure is provided with the spacer 13 and used as an oil ring, the spacer preferably has openings 14 therein to permit oil to flow therethrough.

In operation on a piston, the resilient portions 8 of the expander exert a uniform radial force on the piston ring so that it contacts the cylinder wall with sufficient force to prevent liquids and gases passing between the piston packing 5 and the cylinder. The space between the piston ring 6 and the bottom of the ring groove 4 is occupied by the resilient portions 8 of the expander, and the connecting portions 9 preferably extend into a groove or other formation provided on the piston ring for this purpose. Obviously, in the present embodiment, because the effective space between the piston ring and the bottom of the ring groove is increased, though the actual distance therebetween is the same as previously used, any slight variation in the distance between the bottom of the ring groove and the piston ring will not cause an appreciable variation in the pressure exerted by the expander on the piston ring at these points, so that the piston ring will wear uniformly throughout its entire length.

Other arrangements may be used without deviating from the scope of our invention, and, while we describe a particular construction embodying our invention, it is of course evident that the construction may be varied in many particulars, and we therefore do not limit ourselves to the form and arrangement shown and described.

What we claim as new and desire to secure by Letters Patent is:

1. A piston packing including a plurality of ring members formed of ribbon steel, and a resilient expander of sinuous form having alternate long flexible portions and short connecting portions, said connecting portions having a radius different from that of said flexible portions and each being arranged to provide ring contacting shoulders adapted to engage said ring members, the lateral edges of the remainder of said connecting portions being adapted to engage said ring members in order to separate adjacent ring members a predetermined distance from each other.

2. Piston ring structure adapted for use in the oil groove in a piston of an internal combustion engine having a cylinder wall to be engaged, comprising a pair of thin, split, steel, ring-like rails having thin outer edges adapted to engage the cylinder wall and the rails being adapted to be disposed along the opposite sides of the ring groove, and a one-piece spacer-expander of thin spring ribbon and of generally polygonal shape whose sides are adapted to engage at their centers the bottom of the ring groove, humps joining the adjacent ends of said side and extending between said rails and having edges lying in parallel planes and adapted to engage parallel faces of the rails to space and maintain the rails apart, and portions adjacent the ends of the sides of the polygon and on opposite sides of the middle of the humps and having their outer surfaces parallel to the axis of the rails, said rails having surfaces arranged to be engaged by said portions of said spacer-expander to expand the rails radially.

3. A piston ring assembly comprising a pair of thin, split, steel rails adapted to be maintained in axially spaced relation in a ring groove and having parallel faces and adapted to be positioned along opposite sides of a ring groove and in parallelism therewith, and a generally polygonal spacer-expander of thin, resilient ribbon material having circumferentially spaced parts adapted to engage the bottom of a piston ring groove, portions connecting said parts together and projecting between said rails to maintain said rails axially spaced apart, the axial height of said connecting portions corresponding to the desired axial spacing of said rails, and said spacer-expander engaging surfaces on said rails to radially expand said rails, the engaged portions of said rails being circumferentially spaced and disposed upon opposite sides of the middle of said connecting portions.

4. A spacer-expander member for use with a pair of thin, split, ring-like rails comprising, a one-piece strip of thin spring ribbon material formed into a generally polygonal shape and having sides adapted to engage at their centers the bottom of a piston ring groove, humps of less axial height than said sides joining the adjacent ends of said sides and adapted to extend between said rails and having edges lying in substantially parallel planes and adapted to engage with the adjacent side faces of the rails to space and maintain the rails apart, and having portions adjacent the ends of the sides of the polygon and on opposite sides of the middle of the humps with their outer surfaces substantially parallel to the axis of the polygon arranged to engage the rails to expand the rails radially.

5. A spacer-expander member for use with a pair of thin, split, ring-like rails comprising, a generally polygonal band of thin, resilient ribbon material having circumferentially spaced parts adapted to engage the bottom of a piston ring groove, portions connecting said parts together and adapted to project between the rails to maintain the rails axially spaced apart, the axial height of said connecting portions corresponding to the desired axial spacing of the rails, said band having surfaces arranged to engage and radially expand said rails, said surfaces being circumferentially spaced and disposed upon opposite sides of the middle of said connecting portions.

6. A piston ring assembly for use in a ring groove in a piston, comprising a pair of ring members and a generally polygonal, resilient expander having circumferentially alternate groove-engaging portions and connecting portions having circumferentially spaced ring-engaging shoulders, said shoulders engaging and radially expanding said ring members, and said connecting portions extending outwardly from said shoulders between said ring members and engaging the latter axially to maintain said ring members in axially spaced relationship.

ARDEN J. MUMMERT.
HAROLD P. PHILLIPS.

REFERENCES CITED

The following references are of record in the file of this patent:

UNITED STATES PATENTS

| Number | Name | Date |
|---|---|---|
| 1,529,052 | Anderson | Mar. 8, 1925 |
| 2,175,409 | Phillips | Oct. 10, 1939 |
| 2,025,299 | Mitchell | Dec. 24, 1935 |
| 2,220,947 | Paton | Nov. 12, 1940 |
| 2,231,801 | Cords | Feb. 11, 1941 |
| 2,154,342 | Marvin | Apr. 11, 1939 |
| 307,831 | Barendt et al. | Nov. 11, 1884 |
| 1,707,035 | Wuerfel | Mar. 26, 1929 |
| 1,773,250 | Amberg | Aug. 19, 1930 |